Figure 1:
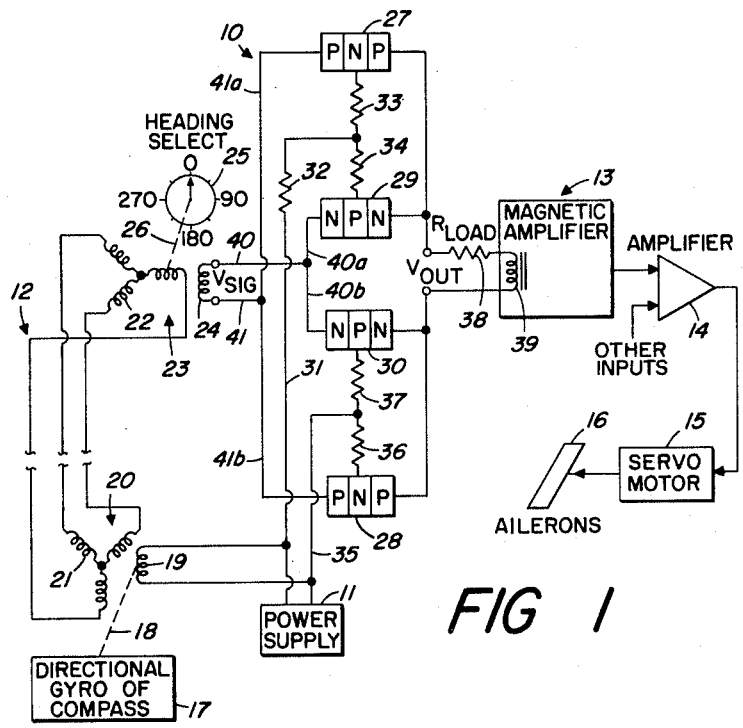

July 6, 1965    R. L. KITTRELL    3,193,747
SERVO SYSTEM WITH PARTICULAR PHASE DETECTOR-MODULATOR
TRANSISTOR BRIDGE CIRCUITS
Filed Oct. 6, 1961    2 Sheets-Sheet 1

INVENTOR.
RICHARD L. KITTRELL
BY
*Moody and Kutzinger*
ATTORNEYS

July 6, 1965 R. L. KITTRELL 3,193,747
SERVO SYSTEM WITH PARTICULAR PHASE DETECTOR-MODULATOR
TRANSISTOR BRIDGE CIRCUITS
Filed Oct. 6, 1961 2 Sheets-Sheet 2
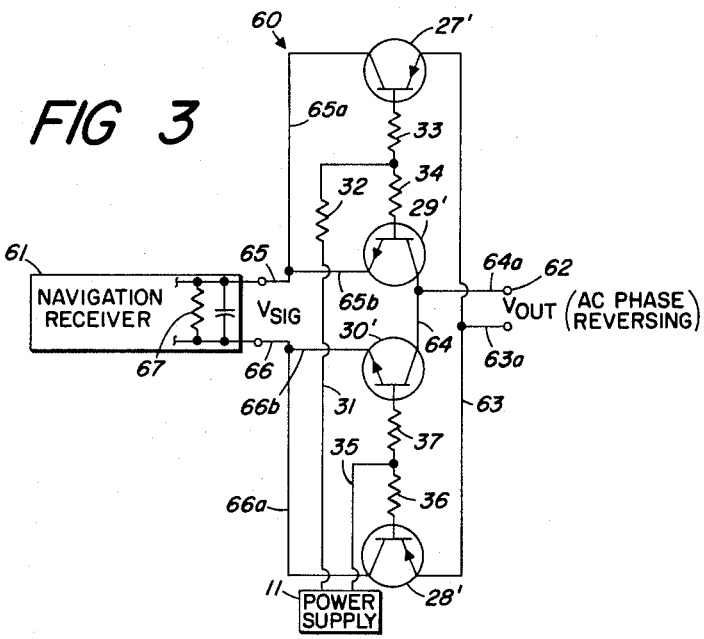
FIG 3
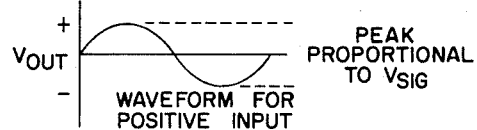
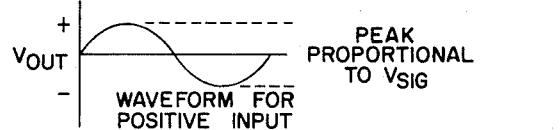
FIG 4
(a) TRANSISTORS LINEAR
(b) WAVEFORM FOR POSITIVE INPUT
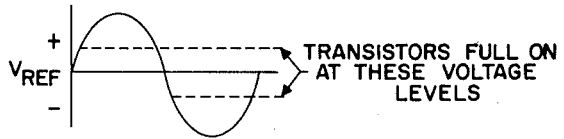
FIG 5
(a) TRANSISTORS AS SWITCHES
(b) WAVEFORM FOR POSITIVE INPUT
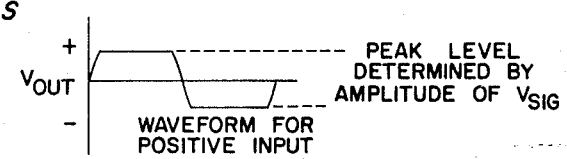
INVENTOR.
RICHARD L. KITTRELL
BY
Moody and Kintzinger
ATTORNEYS

United States Patent Office 3,193,747
Patented July 6, 1965

3,193,747
SERVO SYSTEM WITH PARTICULAR PHASE
DETECTOR - MODULATOR TRANSISTOR
BRIDGE CIRCUITS
Richard L. Kittrell, Cedar Rapids, Iowa, assignor to Collins Radio Company, Cedar Rapids, Iowa, a corporation of Iowa
Filed Oct. 6, 1961, Ser. No. 143,427
1 Claim. (Cl. 318—489)

This invention relates in general to phase detector-modulator bridge circuits, and in particular to a transistorized bridge circuit adaptable for use as a phase detector or as a modulator.

Phase detectors generally used for the type of service contemplated with this invention are adapted for receiving an input A.C. voltage signal substantially in phase or 180° out of phase with respect to an A.C. reference voltage of the same frequency. Such a phase detector is commonly used, for example, to convert an A.C. voltage signal to a D.C. voltage output signal with polarity determined by the phase relation of the A.C. voltage signal to a reference voltage. The magnitude of the D.C. output voltage, with such phase detectors, is generally determined by the amplitude of the signal voltage. This phase and amplitude conversion of an A.C. voltage signal is particularly useful in flight control systems where D.C. voltages are employed for many control functions and for converting the output of a synchro from A.C. to D.C. Various phase detectors currently available are complicated and expensive. Some require adjustment for zero output with zero input and have multiwire and split A.C. voltage reference source arrangements.

It is, therefore, a principal object of this invention to provide an inexpensive and reliable transistorized phase detector.

Another object is to provide a transistorized bridge circuit adaptable for use as a phase detector or as a modulator having a single A.C. voltage reference source.

A further object is to voltage-phase bias transistors of a bridge circuit to conduction by complementary NPN and PNP transistor circuit pairs.

Another object is to provide a transistorized phase detector bridge circuit using a two-terminal A.C. voltage reference source.

A feature of this invention useful in accomplishing the above objects is a two NPN and two PNP transistorized bridge circuit arranged for biasing of the transistors to conduction in two NPN and PNP complementary pairs by the opposite phases, respectively, of a single A.C. reference voltage. It also features a phase detector operable, with a two-terminal reference source, from a two-terminal voltage signal source, and with a two-terminal output. It provides a transistorized phase detector circuit which does not require a centering adjustment or selective matching of components while providing high rejection of quadrature signals not in phase with the reference signal. The phase detector circuit may be readily reversed and used as a D.C. to A.C. modulator. Another feature is that very low power is required from the A.C. voltage reference source for operation of the circuit, either as a phase detector or as a modulator.

Specific embodiments representing what are presently regarded as the best modes of carrying out the invention are illustrated in the accompanying drawings.

Figure 2:
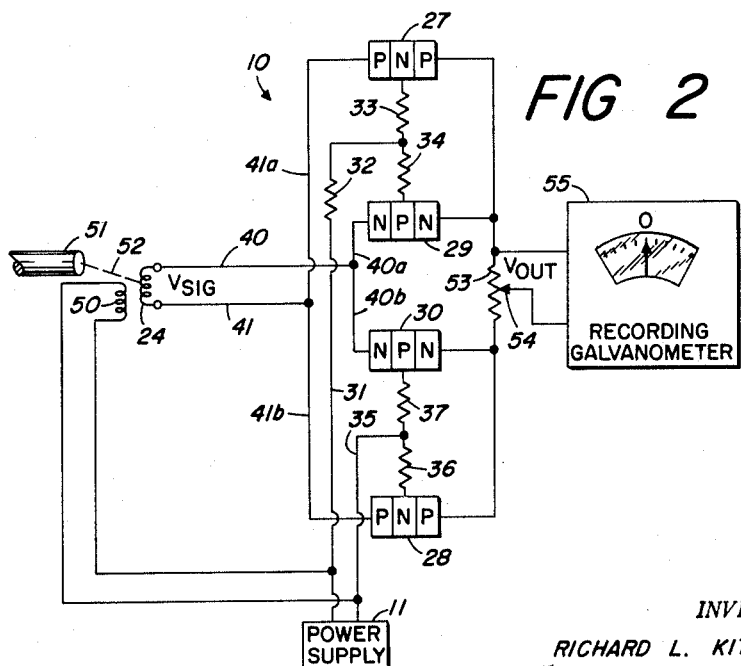

In the drawings:

FIGURE 1 represents a transitorized phase detector employed as part of the servo drive of an automatic flight control system;

FIGURE 2, a phase detector employed in a shaft position recorder;

FIGURE 3, a transistorized circuit, such as employed in FIGURES 1 and 2, adapted for use as a modulator for converting the voltage signal out of a navigation receiver to a modulated A.C. output voltage;

FIGURE 4, the voltage reference and the voltage output curves with the transistors operating in the linear amplifying state in the modulator of FIGURE 3; and FIGURE 5, the voltage reference and the voltage output curves with the transistors operating as switches in the modulator of FIGURE 3.

Referring to the drawings:

The transistorized phase detector of FIGURE 1, generally indicated by the number 10, is employed as part of the servo drive of an automatic flight control system. Power is fed from an A.C. voltage power supply 11 to a synchro section 12 and an A.C. voltage reference source to phase detector 10. The output of the synchro section 12, when it is in other than the null state, provides an A.C. voltage, substantially in-phase or 180° out-of-phase with the A.C. voltage reference source, as a voltage signal input to phase detector 10. Whenever an A.C. voltage signal input is fed to phase detector 10 a D.C. output is provided of plus or minus polarity, depending on the phase of the voltage signal input, for use as an input to magnetic amplifier 13. The output of magnetic amplifier 13 is fed, along with other voltage input signals, to amplifier 14 the output of which drives servo motor 15 to position aileron 16.

Directional gyro 17 provides a command drive through drive train 18 to the movable signal input rotor 19 of the synchro transmitter 20 of synchro section 12. The input rotor 19 is energized by the same A.C. power supply 11 which is also an A.C. voltage reference source for phase detector 10. The induced signal in the Y stator 21 of synchro transmitter 20 is transmitted to the corresponding synchro Y stator 22 in the receiver 23 of synchro section 12. Whenever the position of rotor 24 relative to the Y stator 22 of receiver 23 duplicates the position of rotor 19 relative to the Y stator 21 of transmitter 20, a null condition exists with no signal being induced in rotor 24 from stator 22. However, whenever rotor 24 is in a different position relative to the Y stator 22 of receiver 23 than the position of rotor 19 relative to Y stator 21, a signal is induced in rotor 24. This induced signal will be substantially in-phase or 180° out-of-phase with the A.C. signal fed from A.C. power supply 11 to rotor 19 depending on the relative rotational positions of the rotors 19 and 24 as related to the stators 21 and 22, respectively. Amplitude of the induced signal increases from a state of no signal at null as rotor 24 is being displaced further from the null state in either rotational direction.

A manually set combination knob-dial 25 is provided for selecting a heading. This knob-dial 25 is connected through drive train 26 to stator 22 in order that the stator may be rotationally positioned through a range of 360°.

The phase detector 10 includes two PNP transistors 27 and 28 and two NPN transistors 29 and 30 in a bridge circuit. One line 31 from the two-terminal A.C. voltage reference source (power supply 11) is serially connected through resistor 32 and resistor 33 to the base of PNP transistor 27. Line 31 is also serially connected through resistor 32 and resistor 34 to the base of NPN transistor 29. The other line 35 from the two-terminal A.C. voltage reference source is connected through resistor 36 to the base of PNP transistor 28, and also through resistor 37 to the base of PNP transistor 30.

The output electrodes of PNP transistor 27 and NPN transistor 29 are connected together and to one end of the two-terminal output load, including load resistor 38 and the input coil 39 of magnetic amplifier 13. The output electrodes of PNP transistor 28 and NPN transistor 30 are connected together and to the other end of the two-terminal output load.

Rotor 24 provides a two-terminal voltage signal source which is connected through line 40 and branch 40a to the input electrode of NPN transistor 29, and through branch 40a to the input electrode of NPN transistor 30. The other line 41 from the two-terminal voltage signal source (rotor 24) is connected through branch 41a to the input electrode of PNP transistor 27, and through branch 41b to the input electrode of transistor 28.

Whenever A.C. voltage is applied from power supply 11, for example 26 volts at 400 cycles as from an aircraft power supply, line 31 goes positive for one half cycle and line 35 goes positive for the other half cycle. With line 31 positive relative to line 35, transistors 29 and 28 are biased to a state of conduction as a NPN and PNP complementary pair. This is with a circuit path, plus to minus, from line 31 serially through resistor 32, resistor 34, through NPN transistor 29 from base to output electrode, through the output load, including resistor 38 and coil 39, through PNP transistor 28 from output electrode to base, and resistor 36 to line 35. For the other half cycle, when line 35 is positive relative to line 31, transistors 30 and 27 are biased to a state of conduction as a NPN and PNP complementary pair. For this half cycle the plus to minus circuit extends from line 35 serially through resistor 37, through NPN transistor 30 from base to output electrode, through the output load, through PNP transistor 27 from output electrode to base, and resistors 33 and 32 to line 31. The transistor switching current flow through both transistor biasing circuits is small and reference voltage power consumption is very low.

Biasing of each NPN and PNP complementary pair of transistors for conduction is accomplished with a forward bias, plus to minus, from the P base to the N output electrode of a NPN transistor, and also, a forward bias, plus to minus, from the P output electrode to the N base of the complementary PNP transistor. With the transistors biased to a state of conduction by complementary pairs according to the phase of the reference voltage in the above manner, the phase detector is in a condition for providing a plus or minus D.C. output dependent upon the phase relation of the voltage signal input, from coil 24, to the reference voltage.

The switching current, for turning transistors on by complementary pairs, flows through the output load in opposite directions and thereby tends to cancel itself out. Thus, output of the phase detector 10 is substantially zero with zero input. The A.C. current through the output load resulting from the reference voltage, should it be a problem, may be filtered out in a conventional manner (details not shown). This may be a problem since amplifier 13 may tend to follow the A.C. signal of the reference voltage. However, this phase detector does provide for the development of much larger signal currents through the output load than the maximum current flow developed by the reference voltage.

With transistors 29 and 28 biased to conduction, current can flow from the signal voltage input to and through the output load (resistor 38 and coil 39) in a direction depending upon the polarity of the signal voltage. For example, if line 40 from coil 24 is positive at the same time line 31 is positive, current will flow, plus to minus, through transistor 29 from the input electrode to the output electrode, through the output load, and through PNP transisor 28 from the output electrode to the input electrode, to the relatively negative line 41. Then, on the second half cycle of the voltage reference, as transistors 30 and 27 are biased to conduction, current will flow, plus to minus, through transistor 27, from the input electrode to the output electrode, through the load, and through transistor 30 from the output electrode to the input electrode back to relatively negative line 40. Since the signal voltage has also changed polarity, the direction of current flow through the output load is unchanged thereby providing a unidirectional current flow through the load.

When the polarity of the voltage signal input from coil 24 is reversed from the operating condition set forth above, that is, with line 40 going negative at the same time line 31 is positive, operation will be substantially the same as set forth above. The only exception is that the direction of unidirectional current flow through the load is opposite from the direction obtained under the conditions set forth above. Thus, phase detector 10 provides a D.C. output upon receiving an input signal with the polarity of the output determined by the relative phase of the input signal to the phase of the reference voltage and with the output amplitude proportional to the amplitude of the voltage signal.

In the embodiment of FIGURE 2, wherein substantially all the components of the phase detector are the same as in the embodiment of FIGURE 1, similar components are, for the sake of convenience, numbered the same. In this embodiment phase detector 10 is employed as part of a shaft position recorder. Power is fed from an A.C. voltage power supply 11 to rotor 50 and as an A.C. voltage reference source to phase detector 10. Shaft 51 is connected to coil 24 by drive train 52 for rotation of coil 24 with rotation of the shaft 51.

Whenever coil 24 is moved from the null state, a voltage signal will be induced and fed to phase detector 10 through lines 40 and 41. The phase and amplitude of the voltage signal are determined by the direction of coil rotation from the null state and by the amplitude of rotation from the null state. Phase detector 10, by operation as described for the embodiment of FIGURE 1, develops a voltage output across resistor 53, which replaces resistor 38 and coil 39 of FIGURE 1. The voltage drop across resistor 53 or across a portion thereof, as determined by the position of adjustable tap 54, is applied to recording galvanometer 55. Galvanometer 55 has a center zero indication for no voltage signal input and will give a right or left reading from zero depending upon the polarity of the voltage drop developed through resistor 53.

The FIGURE 1 and FIGURE 2 embodiments are generally operated with the reference voltage set to a relatively high value (26 volts as an example). This provides for operation with the transistors in the switching mode and presenting a very low or a very high impedance between input and output electrodes. Transistors as used in the embodiments of FIGURES 1 and 2 are each shown to have input and output electrodes and a common base. The transistors are shown this way because the direction of current flow through the individual transistors, end-electrode to end-electrode, is reversed from time to time in operation depending on the phase relation of the voltage signal input to the reference voltage. For such operation commercially available transistors have given acceptable performance with emitter and collector ends reversed at random. Of course, more precise results may be provided with PNP and NPN transistors having both PN junctions of each transistor designed for substantially the same current carrying capacity.

When a transistorized bridge circuit is adapted for use as a modulator, it is more important that like transistors have the same emitter to collector orientation as shown in FIGURE 3. A balanced circuit with like transistors having duplicate alignment is important for modulation when the current carrying capacity through both electrode to base junctions of the individual transistors is not substantially the same. It is particularly important for like transistors to have duplicate alignment and provide a substantially balanced bridge circuit when they are operated in the linear range where current capacity and thermal limits may be easily exceeded. Operation in this manner provides a substantially balanced output sine wave such as shown in FIGURE 4b.

If one of the PNP transistors is reversed end for end from the orientation shown in FIGURE 3, the other PNP transistor should be reversed to the duplicating alignment to maintain a substantially balanced bridge circuit. This also applies for the two NPN transistors. Operation of such a modulator with either the PNP, the NPN transistors, or all the transistors reversed, would also provide a substantially balanced output sine wave such as shown in FIGURE 4b.

In the embodiment of FIGURE 3, wherein many components of a modulator are substantially the same as in the phase detectors of FIGURES 1 and 2, similar components are, for the sake of convenience, numbered the same. Reference voltage for modulator 60 is supplied by an A.C. voltage reference source (power supply 11). A voltage signal input to modulator 60 is provided by navigation receiver 61. Modulator 60 impresses the information of the voltage signal input, D.C., or for that matter A.C., if such be the case, upon the reference voltage carrier to provide an A.C. phase reversing voltage output. Such an output could be employed with a flight control system operating on A.C. voltage control signals. The amplitude of the A.C. voltage signal is proportional to the amplitude of the input, and the phase of the output relative to the A.C. reference voltage signal is determined by the polarity of the voltage input signal.

Modulator 60 includes two PNP transistors 27' and 28' and two NPN transistors 29' and 30'. One line 31 from the two-terminal reference voltage source (power supply 11) is serially connected through resistor 32 and resistor 33 to the base of PNP transistor 27'. Line 31 is also serially connected through resistor 32 and resistor 34 to the base of NPN transistor 29'. The other line 35 from the two-terminal A.C. reference voltage source is connected through resistor 36 to the base of PNP transistor 28', and also through the resistor 37 to the base of PNP transistor 30'.

The emitters of PNP transistors 27' and 28' are connected together and to one terminal of two-terminal output 62 by lines 63 and 63a. The collectors of NPN transistors 29' and 30' are connected together and to the other terminal of the two-terminal voltage output 62 by lines 64 and 64a.

Voltage signals are fed from navigation receiver 61 through line 65 and line branches 65a and 65b to the collector of transistor 27' and the emitter of transistor 29', respectively. The other side of the two terminal voltage signal output of navigation receiver 61 is connected through line 66 and line branches 66a and 66b to the collector of transistor 28' and the emitter of transistor 30', respectively.

Whenever A.C. reference voltage is applied from the two-terminal reference voltage source, for example 400 cycles from an aircraft power supply 11, line 31 goes positive for one half cycle and line 35 goes positive for the other half cycle. With line 31 positive relative to line 35, transistors 29' and 28' are biased to a state of conduction as a NPN and PNP complementary pair just the same as the corresponding pair of transistors in the phase detectors of FIGURES 1 and 2. This is with a plus to minus current path from line 31 serially through resistors 32 and 34, through NPN transistor 29' from base to emitter, through a resistive path, as indicated by resistor 67, in navigation receiver 61, through PNP transistor 28' from collector to base, and resistor 36 to line 35. For the other half cycle, when line 35 is positive relative to line 31, transistors 30' and 27' are biased to a state of conduction as a NPN and PNP complementary pair. For this half cycle the plus to minus current path extends from line 35 serially through resistor 37, through NPN transistor 30' from base to emitter, through resistor 67 of the navigation receiver 61, through PNP transistor 27' from collector to base, and resistors 33 and 32 to line 31. The transistor switching current flow through both transistor biasing circuits is small and reference voltage power consumption is very low.

Biasing of each NPN and PNP complementary pair of transistors for conduction is accomplished with a forward bias through the PN junctions of the transistors just as in the phase detectors of FIGURES 1 and 2. It should be realized, however, that the current flow of both transistor voltage biasing paths passes through a resistive path of the voltage signal input source (navigation receiver 61) instead of through the output load as is the case with the phase detectors. In fact, the transistor circuit input connections of the modulator duplicate the transistor circuit output connections of the phase detectors, and the modulator circuit output connections duplicate the input circuit connections of the phase detectors.

With transistors 27' and 30', and transistors 29' and 28' biased to conduction as NPN and PNP complementary pairs of transistors, an A.C. output will be provided at two-terminal output 62 whenever navigation receiver 61 provides a signal voltage input to modulator 60. This A.C. output will have the same frequency as the reference voltage and will be substantially in-phase or 180° out-of-phase relative to the reference voltage depending upon the polarity of the signal voltage from navigation receiver 61. If the output of navigation receiver 61 is such that line 65 is positive relative to line 66 during the half cycle of the reference voltage that line 31 is positive relative to line 35, the positive potential of line 63 will be imposed through transistor 29' to output line 64a, and the relatively negative potential of line 66 will be imposed through transistor 28' to output line 63a. On the other half cycle of the reference voltage the positive potential of line 65 will be imposed through transistor 27' to output line 63a, and the relatively negative potential of line 66 will be imposed through transistor 30' to output line 64a.

When the polarity of the signal voltage from navigation receiver 61 is reversed from the operating condition set forth above, that is, with line 66 positive relative to line 65, operation will be substantially the same as set forth above. The only exception is that the phase of the A.C. voltage output is 180° displaced from the A.C. voltage output provided with the opposite input polarity as set forth above. If the amplitude of the biasing voltage imposed on the transistors by the reference voltage is within the linear range of the transistors, such as indicated in FIGURE 4a, a smoothly varying A.C. voltage output will be provided, such as shown in FIGURE 4b, with the voltage peaks proportional to the voltage signal. FIGURE 4b shows an in-phase output voltage signal for one polarity of the signal voltage input from navigation receiver 61. The reversed phase output resulting from a signal voltage of opposite polarity from navigation receiver 61 would be the same wave displaced substantially 180°.

For operation of the transistors in the linear range the reference voltage is held within a voltage limit that results in the transistors not being biased full on. The degree of conduction of the transistors varies from substantially zero to a maximum, under the full on state, as determined by the biasing voltages attained with a selected reference voltage signal. Thus, for a signal voltage input of one polarity to the modulator 60 an A.C. output signal is provided having the wave shape characteristics of the reference voltage. If the reference voltage is a sine wave the A.C. output signal will be a sine wave with the transistors operating in the linear range. Of course, the phase of the A.C. output signal relative to the reference voltage and amplitude of the output signal are determined by the polarity and the amplitude, respectively, of the signal voltage.

When a higher reference voltage is supplied such that the transistors when biased to conduction are full on, such as indicated in FIGURE 5a, the transistors operate in the switching mode. With such operation, the in-phase output of the modulator 60 for one polarity input from navigation receiver 61 would provide an A.C. output wave form as shown in FIGURE 5b. For the opposite polarity input from navigation receiver 61, the wave form of the voltage output signal is the same as the wave form shown in FIGURE 5b except that it is displaced 180°.

Thus, from the foregoing description it will be seen that an improved, relatively inexpensive and reliable transistorized bridge circuit is provided that is readily adaptable for use as a phase detector or as a modulator. Further, it provides a two NPN and two PNP transistorized bridge circuit arranged for the biasing of the transistors to conduction alternately by two NPN-PNP complementary pairs. Still further, this is accomplished by opposite phases of a single A.C. reference voltage in a bridge circuit having a two-terminal voltage reference source, a two-terminal voltage signal source, and a two-terminal output.

Whereas this invention is here illustrated and described with respect to several specific embodiments thereof, it should be realized that various changes may be made without departing from the essential contributions to the art made by the teachings hereof.

I claim:

A transistorized bridge circuit connected to function as a phase detector for converting an A.C. voltage signal input to a D.C. voltage output in a flight control system with the phase detector circuit having; a first PNP type transistor, a second PNP type transistor, a first NPN type transistor, and a second NPN type transistor; each of said PNP and NPN type transistors having a base, and two opposite end electrodes including an input and an output electrode; first circuit means interconnecting the bases of said first PNP transistor and said first NPN transistor; second circuit means interconnecting the bases of said second PNP transistor and said second NPN transistor; a two-terminal A.C. voltage reference source with one terminal connected to said first circuit means and the second terminal connected to said second circuit means; a two-terminal voltage signal source with one terminal connected to the end input electrodes of two of said transistors and the other terminal connected to the end input electrodes of the other two transistors; with said first circuit means and said second circuit means both including resistive-impedance means, and the terminals of said two-terminal voltage reference source being so connected to said first circuit means and said second circuit means, respectively, as to provide resistive impedance between each of the terminals of the voltage reference source and the bases of the respective transistors; a two-terminal output with one terminal connected to end output electrodes of two of said transistors and the other terminal connected to end output electrodes of the other two transistors; impedance means electrically connecting end output electrodes of two of said transistors to end output electrodes of the other two transistors for the development of a D.C. voltage output signal when there is a phase difference between the signal of said A.C. voltage reference source and the signal of said signal source; and with the flight control system having; a synchro device provided with a command drive input, and an A.C. signal input from an A.C. power source; amplifying means for the D.C. voltage output signal of said phase detector; servo motor means driven by the output of said amplifying means; and flight control surface means drive connected to and positioned by said servo motor means; said A.C. power source being said two-terminal A.C. voltage reference source; the two-terminal output of said synchro device being connected as an A.C. voltage signal input source to said phase detector with one terminal connected to the input electrodes of two of said transistors and the other terminal connected to the input electrodes of the other two transistors; and with said impedance means connecting the output electrodes of two of said transistors to the output electrodes of the other two transistors providing a conductive-resistive path therebetween.

References Cited by the Examiner
UNITED STATES PATENTS

| | | | |
|---|---|---|---|
| 2,883,613 | 4/59 | Van Winkle | 318—30 X |
| 2,994,044 | 7/61 | Straube | 332—47 |
| 3,010,079 | 11/61 | Straube | 332—47 |

JOHN F. COUCH, *Primary Examiner.*